No. 814,873. PATENTED MAR. 13, 1906.
T. M. RIEGEL.
CULTIVATOR.
APPLICATION FILED OCT. 2, 1905.
2 SHEETS—SHEET 2.
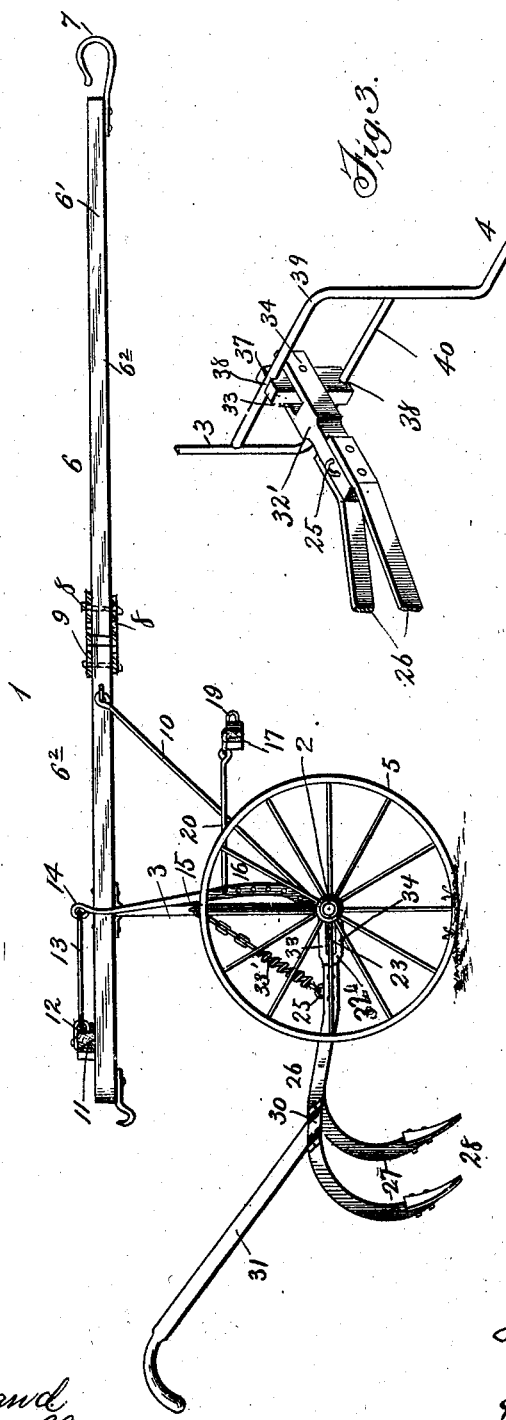
Witnesses
W. H. Ourand
J. P. Duffie
Inventor
T. M. Riegel
By
J. S. Duffie
Attorney

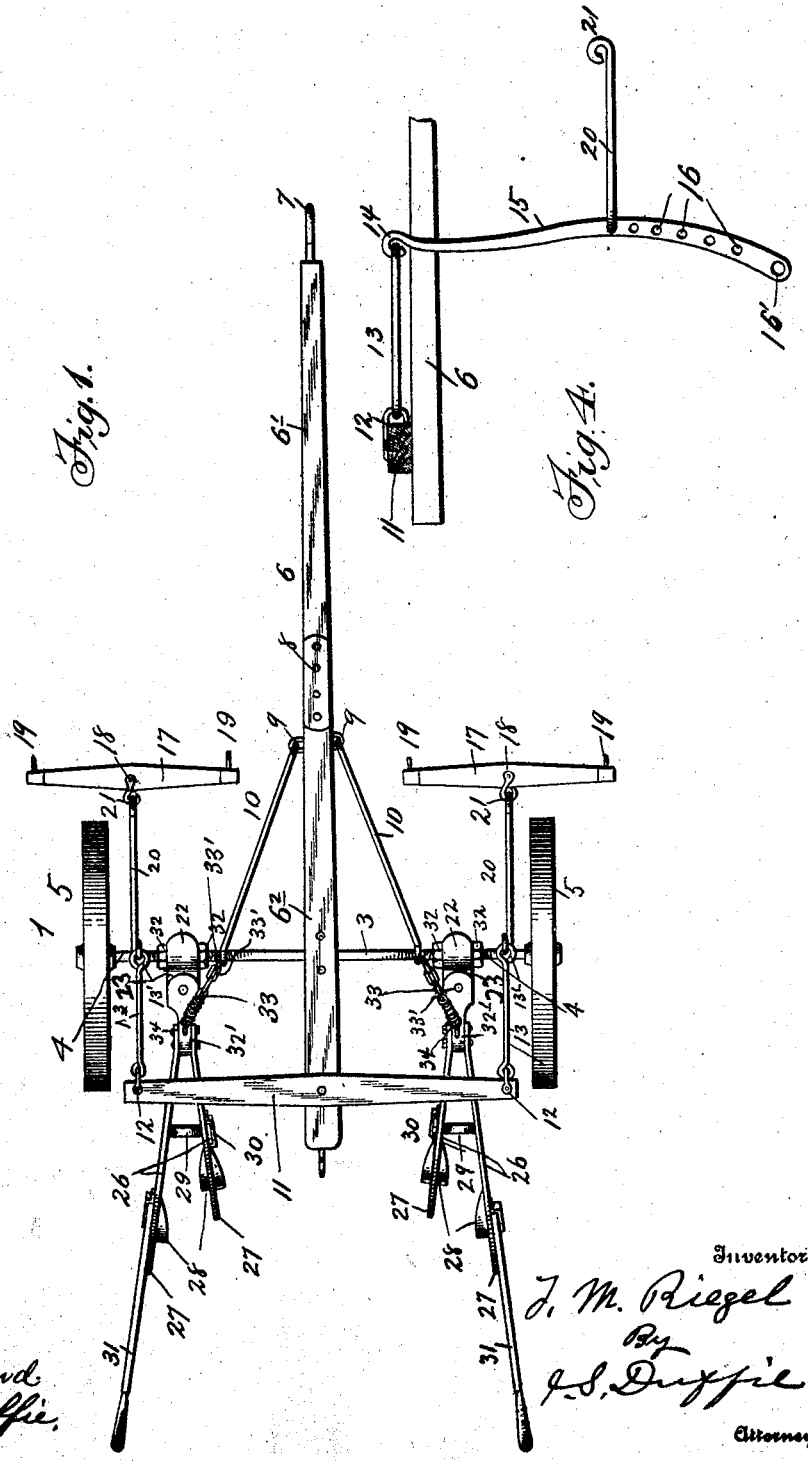

UNITED STATES PATENT OFFICE.

THOMAS M. RIEGEL, OF FULLERTON, NEBRASKA.

CULTIVATOR.

No. 814,873.     Specification of Letters Patent.     Patented March 13, 1906.

Application filed October 2, 1905. Serial No. 280,964.

*To all whom it may concern:*

Be it known that I, THOMAS M. RIEGEL, a citizen of the United States, residing at Fullerton, in the county of Nance and State of Nebraska, have invented new and useful Improvements in Cultivators, of which the following is a specification.

My invention has relation to new and useful improvements in cultivators; and it consists in the novel construction, combination, and arrangement of parts, as set forth in the specification and claims hereunto attached.

The object of my invention is the production of a cultivator which way be used in connection with one, two, or any number of horses.

My invention is so constructed that it may cultivate both sides of the growing corn or other crop at one operation. When the crop is small, the cultivator passes over the row and the growing crop passes under the bow of the axle; but when the crop becomes too tall to pass under the bow of the axle I may run the cultivator between the rows and plow the middle between the two rows, in which case I remove the front end of the tongue and substitute therefor a pair of shafts, and if more than one horse is required I use the team tandem.

In the accompanying drawings, in which like parts are designated by like characters throughout the several views, Figure 1 is a top plan view of my invention. Fig. 2 is a side elevation of my invention. Fig. 3 is a detail perspective view showing another manner of securing the plow-beams to the frame. Fig. 4 is a side elevation showing a curved perforated bar to which the swingletree is attached by means of a hook.

My invention is described as follows: The numeral 1 represents my improved cultivator. 3 represents the axle of my cultivator, which axle consists of a central bow-shaped portion 2 and two outwardly-extending threaded spindles 4. Said frame is mounted on a pair of wheels 5. Rigidly secured to the central part of the top of the bowed-shaped portion 2 of said frame 3 is a tongue 6, provided at its front extremity with a holdback-hook 7. Said tongue is preferably made in two parts, 6' and 6², which are removably secured together by means of two perforated plates 8, which are fastened to the abutting ends of the tongue by bolts or other equivalent means 9. It will be apparent that when the corn or other crop is of considerable growth it would be difficult, if not impossible, for two horses to straddle the rows or plow between the rows, and consequently a tongue would be objectionable. By constructing the tongue in the manner just described I may remove the front part 6' of said tongue and substitute therefor a pair of shafts, which will enable me to use one horse or two or more horses in tandem, and thus overcome the objectionable features mentioned. Secured at their upper eyed ends to the part 6² of said tongue 6 by staples or other equivalent means are strengthening-rods 10, the lower looped ends of which securely encircle the said threaded spindles 4. Pivotally secured near the rear end of said part 6² of said tongue 6 is a double trace-bar 11, provided near each end with the usual clevis 12. Secured at their rear ends to said clevises 12 are longitudinal rods 13, provided at their front ends with eyes. Secured in the eyes of said rods 13 at their upper hooked ends 14 are downwardly-extending curved bars 15, provided with a series of perforations 16. Each of said bars is provided at its extreme lower end with a perforation 16', whose diameter is greater than the diameters of said threaded spindles 4. Said bars 15 are secured at their lower ends to said threaded spindles 4 by passing said spindles through said perforations 16'. Swingletrees 17, provided with the usual hooks 18 and trace-hooks 19, are secured to said perforated bars 15 by means of longitudinal rods 20, provided at their front ends with eyes 21, into which eyes are placed the hooks 18 of said swingletrees 17. By providing said bar 15 with perforations 16 and the rear ends of said longitudinal rods with hooks I am enabled to secure said longitudinal rods 20 at any desired point along said bars 15, and thereby adjust the swingletrees 17 at any desired distance above the ground. This construction enables me to adjust the swingletrees to suit the condition of the soil to be cultivated. Journaled on said spindles 4 are hubs 22, having necks 23. My improved cultivator is also provided with outer and inner beams 26, which are formed to curve downwardly at their rear ends and terminate in feet 27, provided with points 28. Said beams are braced a predetermined distance apart by braces 29. Said beams are also provided with sockets 30, which are secured to the outer faces of said outer beams and to the inner faces of said inner beams, said sockets being adapted to receive and hold handles 31. By providing said beams with sockets in the manner just described I am enabled to secure said handles to said outer or inner beams, as desired. It will be obvious that there are a number of instances where it would be desirable to secure said handles in the sockets of said inner beams, as it would greatly facilitate in the handling of the cultivator. It will also be apparent that the plows may be brought still closer together by running nuts 32, screwed on said threaded spindles, inwardly and sliding the said hubs inwardly. Said beams 26 are secured at their front ends to blocks 32', bifurcated at their front ends, forming upper jaws 33 and lower jaws 34, said jaws being provided with vertical perforations. Said blocks are hinged to said hubs 22 by passing and securing the perforated necks 23 of said hubs between the jaws of said blocks. My manner of securing said beams to said cultivator has resulted in the provision of a cultivator provided with beams susceptible of lateral and vertical motions. This feature is one of great merit, as it allows the cultivator to jump and avoid clods, stones, and such other obstacles as are met with in cultivating land, and consequently the cultivator may not only be handled more easily, but the liability of its breakage is greatly diminished. My improved cultivator is also provided with coiled springs 33', having their lower ends secured to staples 25, secured to the rear ends of said blocks 32', and their upper ends provided with chains hooked to said frame 3. I do not confine myself to this specific manner, above described, of securing the plow-beams to the frame of the cultivator, but claim the right to do away with the hubs 22 and substitute therefor blocks 37, provided at each end with a concave transverse recess 38. In this case the said blocks are secured to the plow-beams so that the perforations in the jaws thereof extend transversely, and the said blocks 37 are secured between said jaws in a vertical position. The frame 3 in this case is so constructed as to provide upper bars 39 and lower bars 40, which give an oblong rectangular effect, the said upper bars 39 extending downwardly and outwardly, terminating in spindles 41, by means of which said frame may be mounted on said wheels 5. When in position, the said blocks 37 are placed between the said bars 39 and 40 in a vertical position, the middle portions of said bars resting in said concave recesses 38.

I claim—

1. In a cultivator a bowed axle, provided with two outwardly-extending threaded spindles 4; wheels 5, mounted on said spindles; a tongue 6, secured to the top of said bowed axle; hubs 22, having necks 23, secured to said bowed axle; beams 26, provided with sockets 30, and terminating downwardly at their rear ends in feet 27, provided with plow-points 28; braces 29; handles 31, secured to said beams; blocks 32', bifurcated at their front ends, forming upper jaws 33, and lower jaws 34, provided with vertical perforations; coiled springs 33', provided at their upper ends with chains secured to said blocks, and nuts 32, screwing on said threaded spindles, the plows of said cultivator being adapted to be brought any desired distance apart, by screwing said nuts inwardly or outwardly, substantially as shown and described and for the purposes set forth.

2. In a cultivator a bowed axle 3, provided with upper bars 39, lower bars 40, and outwardly-extending spindles 4; blocks 37, provided at each end with a recess 38; blocks 32', bifurcated at their front ends, forming upper jaws 33, and lower jaws 34, provided with transverse perforations; beams 26, secured at their front ends to said blocks, said beams extending downwardly at their rear ends and terminating in feet 27, provided with plow-points 28, and handles 31, said cultivator provided with tongue and swingletrees.

In testimony whereof I affix my signature in presence of two subscribing witnesses.

THOMAS M. RIEGEL.

Witnesses:
 JAMES BARNES,
 FRANK SHEAFF.